H. LEITNER.
SCREW PROPELLER.
APPLICATION FILED JAN. 16, 1922.

1,438,838.

Patented Dec. 12, 1922.
2 SHEETS—SHEET 2.

Patented Dec. 12, 1922.

1,438,838

UNITED STATES PATENT OFFICE.

HENRY LEITNER, OF KINGSWAY, LONDON, ENGLAND.

SCREW PROPELLER.

Application filed January 16, 1922. Serial No. 529,762.

*To all whom it may concern:*

Be it known that I, HENRY LEITNER, a subject of the King of Great Britain, residing at Regent House, Kingsway, London, England, have invented new and useful Improvements in Screw Propellers, of which the following is a specification.

This invention relates to metal screw-propellers of the type in which separate blades are independently attached to a hub by means of a stem or stalk on the said blade which engages a socket in the hub.

According to the invention the blade and stem or stalk are made integral, being stamped, rolled, pressed or formed in any other suitable manner from metal plates of taper gauge such that the blade decreases in thickness from the root or butt to the tip to conform to the stresses which are set up in the blade when in use. In practice each combined blade and stem or stalk is preferably made in two longitudinal parts or halves which are welded together along the meeting edges.

The stem or stalk may be retained in the socket of the hub in any suitable manner. For example, the end of the said stem may be formed with a flange providing a shoulder which engages a recess or the like in the hub socket. Or a conical shoulder may be provided upon the stem or stalk by expanding or flaring the end of the latter and, if desired, stiffening the expanded or flared end by an internal liner of appropriate shape between which and the stem a metal filling may be inserted. In some cases an external sleeve may be riveted, welded, brazed, or otherwise secured to the flared end of the stem or stalk, the extremity of the said sleeve adjacent to the stem expansion being made bulbous or flanged to form the shoulder on the stem, and a metal filling being inserted, if desired, between the said flange and the conical or flared stem end.

In a modified construction a separate flange may be provided to form the shoulder on the stem which flange is secured to the inturned end of the stem or stalk by a central bolt which engages a screw-thread formed on the inner face of the inturned end of an inner liner or sleeve which is riveted or otherwise attached to the stem.

In some cases the inturned end of the stem may be dished and the flange piece and liner shaped to conform thereto. Also an external sleeve may be fitted around the stem or stalk, which sleeve may be a separate unit or be integral with the flange piece.

To enable the invention to be fully understood, I will describe it by reference to the accompanying drawing, in which:—

Figure 1:
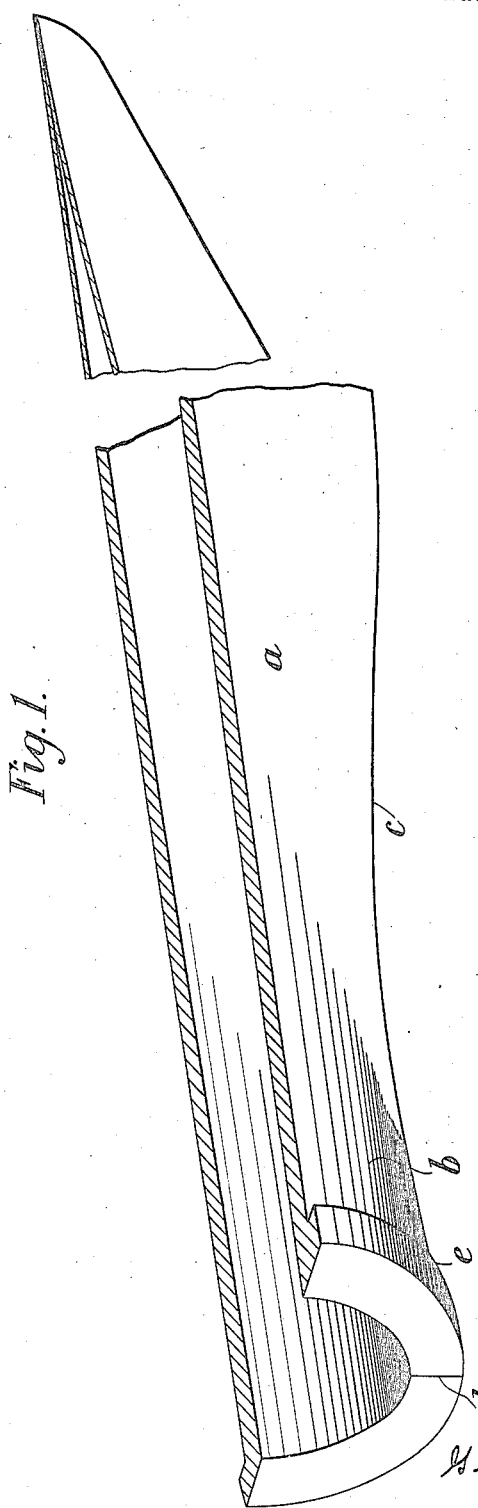
Figure 1 is a sectional perspective view of a screw-propeller blade and stem or stalk constructed in accordance with the invention.

Referring to Figure 1, $a$, $b$ are, respectively, the blade and stem or stalk thereof, which are made integral and stamped or formed from a pair of metal plates of taper gauge, that is to say, the blade decreases in thickness from the root or butt to the tip of the blade, as indicated. These two plates form two longitudinal parts or halves which are welded together along their meeting edges, which, in the case of the blade, constitute the leading and rear edges thereof. One of these edges is indicated at $c$. $d$ indicates the joint formed by a pair of these meeting edges of the part of the plates forming the stem or stalk. $e$ is the flange formed on the stem or stalk so as to provide a shoulder to engage a recess or the like in the socket in the propeller hub in which the stem or stalk fits.

Figure 2:
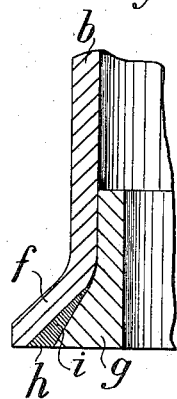
Figure 2 is a longitudinal section of a portion of the stem or stalk illustrating a modified construction thereof.

$f$, Figure 2, indicates the conical shoulder which may be provided on the stem or stalk $b$ instead of the flange $e$, Figure 1, the said shoulder $f$ being formed by expanding or flaring the end of the said stem. $g$ is the liner for stiffening the said expanded end of the stem, if desired, and $h$ is the space which may be left between the liner and the stem in which the metal filling $i$ is inserted.

Figure 3:
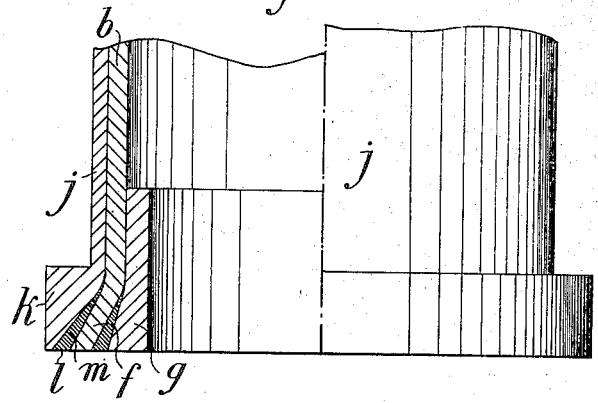
Figure 3 is a longitudinal view, half in section and half in elevation, of another modified construction of the stem or stalk

In Figure 3, $j$ is the external sleeve with which the construction indicated in Figure 2 may be furnished, the said sleeve being secured to the flared end $f$ of the stem or stalk. $k$ is the flange on the extremity of the sleeve $j$ adjacent to the stem expansion to form the shoulder on the stem, and $l$ is a space which may be left between the said flange and flared end $f$ of the stem to receive the metal filling *m*. Instead of the flange *k* the sleeve *j* may be formed with a bulbous end.

Figure 4:
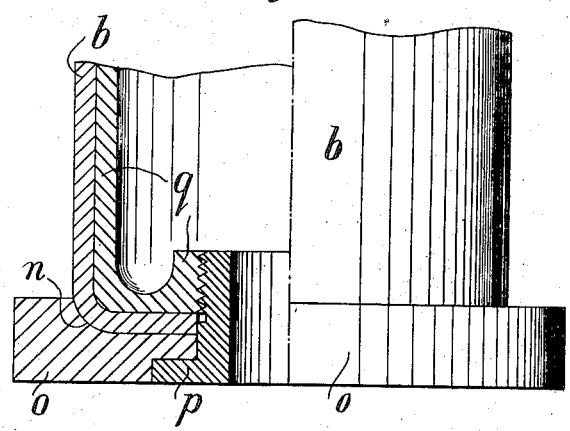
Figures 4 and 5 are similar views to Figure 3 of further modifications of such construction.

Figure 4 illustrates the modification in which the end of the stem or stalk is inturned, as indicated at *n*, and a separate flange *o*, to form the shoulder on the said stem, secured thereto by a central bolt *p* engaging a screw-thread on the inner face of the inturned end of the liner or sleeve *q* within the stem and which is riveted or otherwise attached to the said stem. In order that the bolt *p* may be of large diameter it is advantageously made hollow, as shown, to prevent it being unduly heavy.

Figure 5:
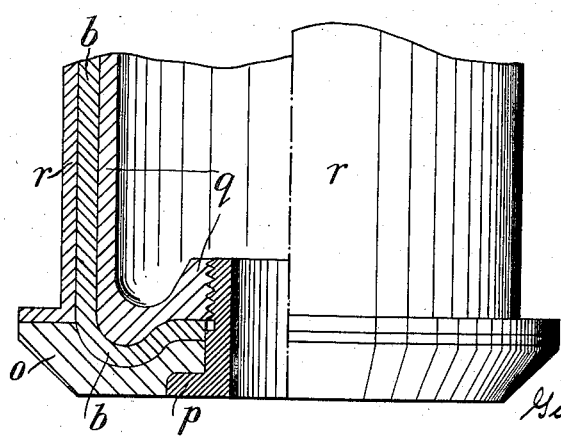

Figure 5 shows a construction which is similar to that shown in Figure 4 except that the inturned portion of the stem *b* is dished and the flange *o* and sleeve *q* shaped to conform thereto and an external sleeve *r* is fitted around the said stem which sleeve may be separate from the flange *o* as indicated, or integral therewith.

Claim.

Screw propellers of the kind hereinbefore described, wherein each blade and stem thereof are formed integral from metal plates of taper gauge decreasing in thickness from the root or butt to the tip and wherein each combined blade and stem is made in two longitudinal parts which are welded together along the meeting edges.

HENRY LEITNER.